United States Patent

[11] 3,588,178

| [72] | Inventor | Jean Fulchiron |
| | | Metz-Borny, France |
| [21] | Appl. No. | 755,587 |
| [22] | Filed | Aug. 27, 1968 |
| [45] | Patented | June 28, 1971 |
| [73] | Assignee | Institut de Recherches De La Siderurgie Francaise |
| | | Saint Germain-en-Laye, (Yvelines), France |
| [32] | Priority | Sept. 6, 1968 |
| [33] | | France |
| [31] | | P.V.120148 |

[54] APPARATUS FOR CONVEYING AND DISTRIBUTING PARTICULATE MATERIAL
3 Claims, 3 Drawing Figs.

[52] U.S. Cl. ..................................................... 302/28, 302/29
[51] Int. Cl. ....................................................... B65g 53/04
[50] Field of Search........................................... 302/28, 29, 31

[56] References Cited
UNITED STATES PATENTS

| 3,253,864 | 5/1966 | Sayre | 302/29 |
| 1,120,535 | 12/1914 | Pruden | 302/29 |
| 2,882,097 | 4/1959 | Hamren | 302/29 |

FOREIGN PATENTS

| 355,086 | 7/1961 | Switzerland | 302/31 |
| 607,009 | 8/1948 | Great Britain | 302/29 |

Primary Examiner—Andres H. Nielsen
Attorney—Kurt Kelman

ABSTRACT: Particulate material is conveyed pneumatically along an elongated passageway by air discharged from a series of shutters in an air conduit arranged inside the passageway and directed away from the entry port. A plurality of discharge orifices in the bottom of the passageway distribute the conveyed material to receptacles placed therebelow.

PATENTED JUN28 1971 3,588,178

INVENTOR:
JEAN FULCHIRON
BY Kurt Kelman
AGENT

APPARATUS FOR CONVEYING AND DISTRIBUTING PARTICULATE MATERIAL

BACKGROUND AND SUMMARY OF THE INVENTION

The present invention relates to pneumatic conveyors for particulate material designed to distribute the conveyed material to a plurality of receptacles.

Various apparatus for conveying particulate, i.e. pulverulent or granular, material has been used for assorted purposes. In metallurgical processes, for instance, such as in feeding material to blast furnaces, conveyor bands have been used.

The handling of particulate material in conveyors becomes complicated when several devices or receptacles are to be fed simultaneously or successively. For this purpose, pivoting and/or rotating conveyors and distributors have been used but such apparatus is complex, cumbersome and expensive.

It is the primary object of the present invention to remedy these inconveniences and to provide a simple conveyor which is designed to distribute the conveyed material in a desired manner.

This object is accomplished in accordance with this invention with a substantially horizontally extending elongated passageway for the particulate material and a substantially horizontal gas conduit extending longitudinally inside the passageway. The passageway includes an upper portion defining an entry port for receiving the material at one end of the passageway for receiving the material, and a lower portion defining a plurality of discharge orifices for the material, the orifices being spaced along the passageway. The gas conduit has an opening for receiving a gas, such as air, under pressure at the one end, and defines a plurality of apertures, such as venetian shutters, opening into the passageway at an acute angle, with the apertures directed away from the one end.

In other words, the particles of the material are entrained by a directed air current in the passageway from one end thereof to the other, being discharged along the path of conveyance through the orifices in the bottom of the passageway. While air may be most convenient in most cases, any suitable gas under pressure may be supplied to the opening in the conduit at the one end to produce the current, and the angularly directed apertures in the conduit impart to the escaping gas a longitudinal movement entraining the particulate material to the end of the passageway opposite to the one end at which the entry port is located.

A useful form of apertures are venetian shutters provided in an upper wall of the gas conduit. If it is desired to heat and/or dry the particulate material in the passageway, a hot gas may be used.

BRIEF DESCRIPTION OF DRAWING

The above and other objects, advantages and features of the invention will be better understood by reference to the following detailed description of a preferred embodiment, taken in conjunction with the accompanying drawing wherein.

DETAILED DESCRIPTION

Figure 1:
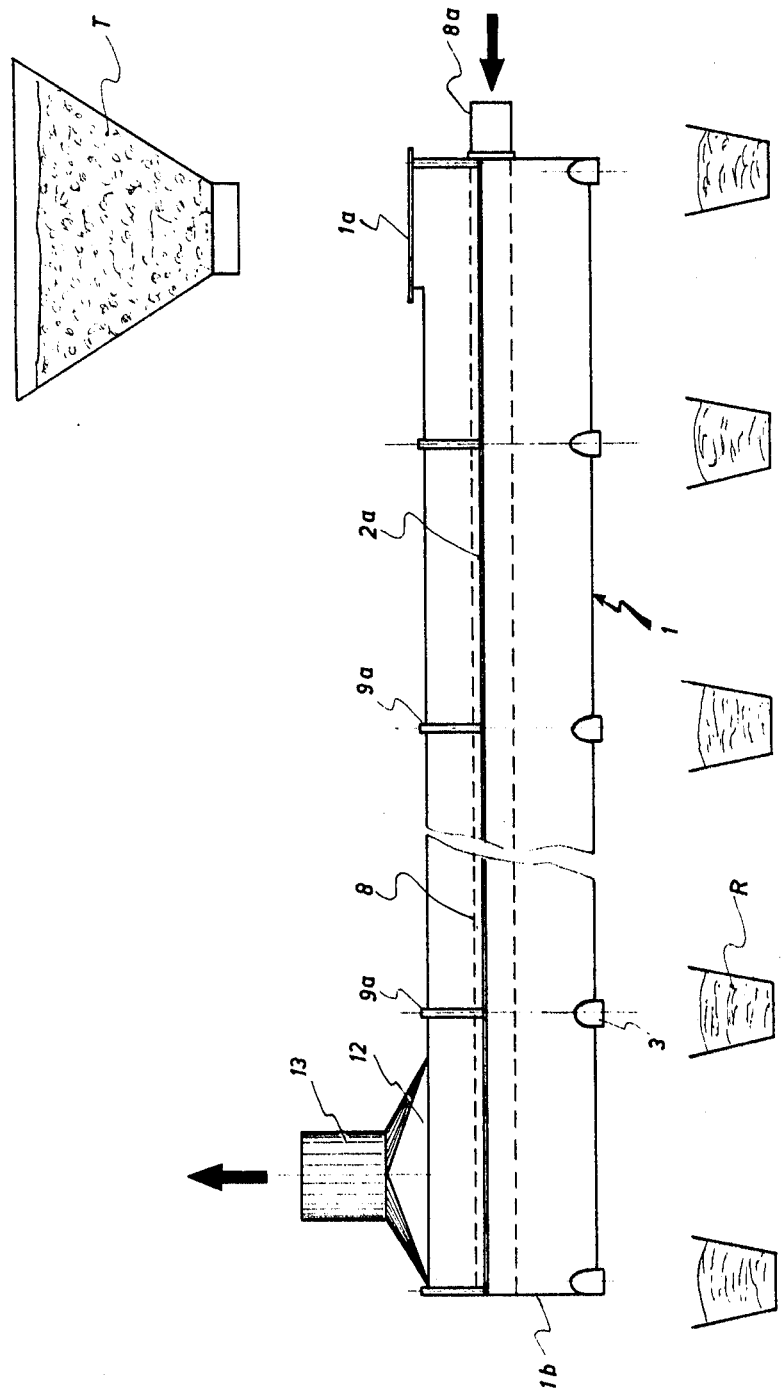
FIG. 1 is a side view of an apparatus according to the present invention.

The elongated passageway 1 for the pulverulent material 15 is shown to extend horizontally and includes an upper portion or cover 17 and a lower portion 19 having the shape of a V-shaped trough. The upper and lower passageway portions have mating flanges which support the passageway on a pair of girders 2a, 2b.

I have successfully made the passageway of 2.5 mm. gauge sheet metal, 6 m. long, 0.62 m. high, and 0.45 m. wide at the upper portion.

The upper portion of the passageway has a top wall which defines an entry port 1a at one end of the passageway for receiving the particulate material from a hopper T mounted above the entry port.

The lower portion 19 of the passageway defines a plurality of discharge orifices 3 for the material 15, which are spaced along the passageway, seven equidistantly spaced orifices having been provided in a passageway of the indicated length. The V-shape of the trough facilitates the movement of the material towards the discharge orifices in the bottom of the trough. Receptacles R are mounted below the orifices to receive the particulate material distributed by the apparatus as the material is conveyed therethrough.

Figure 2:
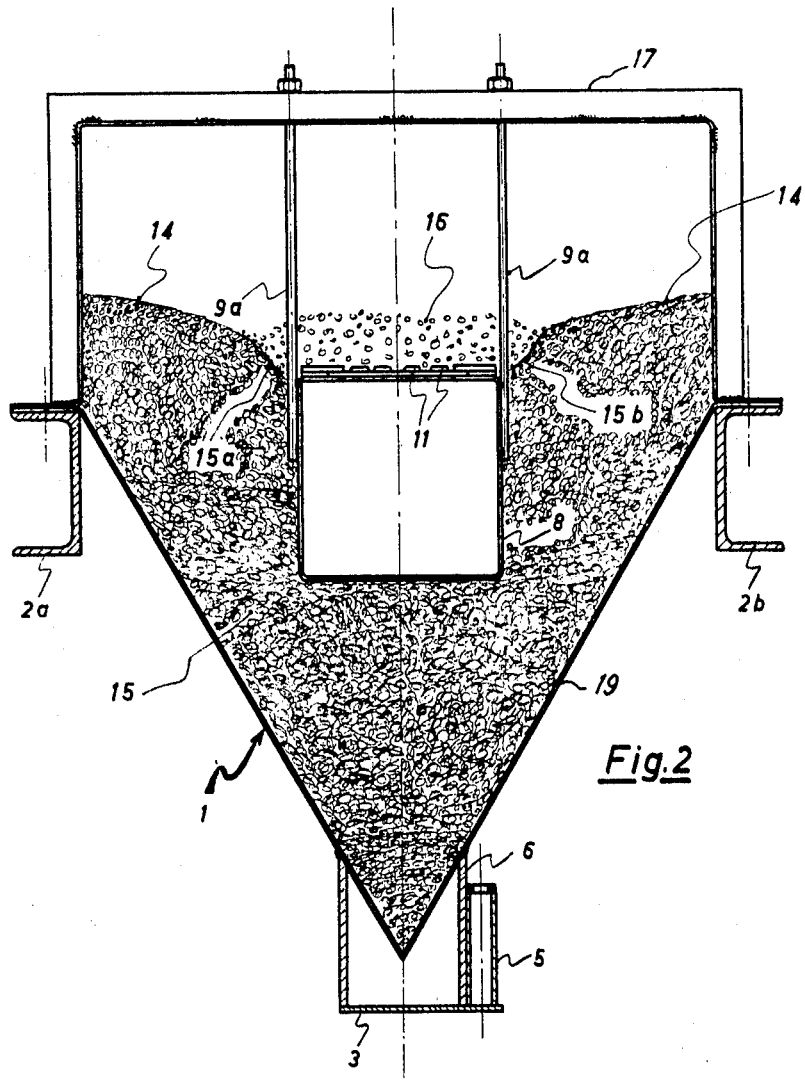
FIG. 2 is a section of the apparatus perpendicular to its elongation.
Figure 3:
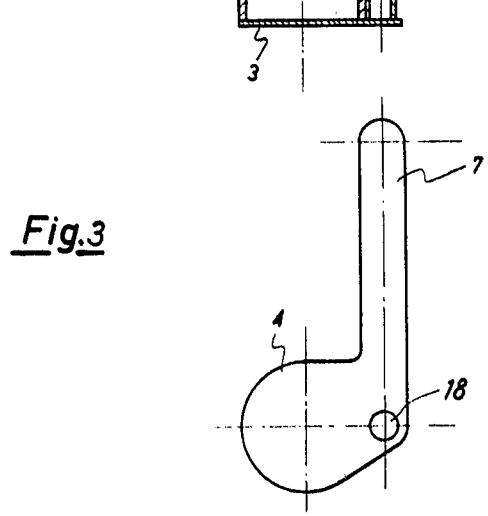
FIG. 3 schematically shows a closure for the discharge orifices.

As indicated in FIG. 3, movable closures 4 may be placed over the orifices 3, each closure having a handle 7 for pivoting the closure about fulcrum 18 so that selected ones of the orifices may be selectively opened and closed. As FIG. 2 indicates, each orifice is defined by a tubular outlet 6 fixed to, or integral with, the trough 19. The bearing 5 on the outlet 6 carries the pivot pin for the closure 4. In this manner, any of the receptacles may be readily shut off from a supply of the material while feeding to the other receptacles is continued.

A horizontal gas conduit 8 extends longitudinally inside the passageway along its entire length and is suspended therein substantially along a center axis of the passageway. In the above-mentioned embodiment, I have made this conduit also of 2.5 mm. gauge sheet metal and of square cross section with walls having a width of 0.14 m. The conduit is suspended in the passageway by suspension bars 9a, 9b whose upper ends are threaded into the upper wall of the cover 17.

An opening 8a at the one end of the passageway slightly upstream from the entry port 1a receives gas under pressure from a source (not shown). The upper wall of the conduit is pierced at regular intervals along its length, the apertures in the upper conduit wall permitting passage of the conveying gas from the conduit into the passageway 1. The gas passage is directed by the apertures at an acute angle, in respect to the horizontal, towards the other end 1b of the passageway. This effect is most readily obtained by sheet metal venetian shutters 11 overhanging the apertures in the upper conduit wall. The conveying gas finally leaves the conduit through an opening 12 into hood 13. If desired, a discharge conduit may connect the hood to a cyclone (not shown).

The apparatus operates as follows, as will be readily understood from the above description of its structure:

The granular or pulverulent material is fed by gravity into the passageway 1 from a hopper T positioned above the entry port 1a. As the material begins to drop to the bottom of the passageway and begins to be displaced towards the end 1b thereof along the passageway, it will eventually reach the level 14 along the length of the passageway, at which point the apparatus is in condition for continuous operation.

As gas is blown into opening 8a and escapes directionally through venetian shutters 11, the material 15 overlying the shutters is formed into a fluidized bed 16 of fine particles which move along the passageway towards passageway end 1b in a channel defined by two sidewalls 15a, 15b formed by the material along the fluidized bed. The thickness of the fluidized bed 16 is such that the loss of gas pressure across the bed is equal to the gas pressure in conduit 8. Thus, there will be no gas current above the fluidized bed of particulate material.

The pressure and supply of gas, such as air, to the conduit 8 are accordingly adjusted as functions of the type of material conveyed and the total output thereof that is desired to be removed through discharge orifices 3. Obviously, any desired number of orifices (and corresponding receptacles) may thus be supplied with particulate material conveyed through an apparatus of the described type. For example, of a maximum amount of material is withdrawn from the passageway continuously through one of the orifices, the corresponding valley in material 15 at this point is automatically filled with material from the neighboring site and from the overlying fluidized bed of constantly moving material. Thus, the supply of material to any orifice is never stopped.

One of the great advantage of this apparatus is its self-regulation of output. If, for instance, too much material is suddenly supplied through entry port 1a, this causes a corresponding loss of gas pressure passing into the passageway through the apertures in the gas conduit 8, thus preventing a corresponding increase in the output of material through discharge orifices 3.

Another important advantage is the fact that the apparatus is not limited in length of conveying path and/or in the number of discharge stations.

If desired, the manually operated covers over the discharge orifices may be replaced by remote-controlled valves, it being understood that many other variations and modifications of structural details may occur to those skilled in the art without departing from the spirit and scope of the present invention.

I claim:
1. An apparatus for conveying and distributing a particulate material, comprising
   1. a substantially horizontally extending elongated passageway for the material, the passageway including
      a. an upper closure portion defining an entry port at one end of the passageway for receiving the material, and
      b. a lower V-shaped trough portion defining a plurality of discharge orifices for the material, the orifices being spaced along the bottom of the passageway; and
   2. a substantially horizontal gas conduit having a plane upper face and extending longitudinally inside the passageway, the conduit
      c. having an opening for receiving a gas under pressure at the one end, and
      d. defining a plurality of apertures in the upper face facing the upper portion and opening into the passageway at an acute angle, with the apertures directed away from said one end, whereby gas under pressure escaping from the conduit apertures into the passageway imparts a longitudinal movement to the material in the passageway in a direction away from the one end.

2. The apparatus of claim 1, further comprising movable covers arranged for selectively opening and closing selected ones of said orifices.

3. The apparatus of claim 1, wherein said gas conduit is suspended in the passageway intermediate the upper and lower portions thereof.